US007280943B2

(12) United States Patent
Zador et al.

(10) Patent No.: US 7,280,943 B2
(45) Date of Patent: Oct. 9, 2007

(54) SYSTEMS AND METHODS FOR SEPARATING MULTIPLE SOURCES USING DIRECTIONAL FILTERING

(75) Inventors: Anthony M. Zador, New York, NY (US); Barak A. Pearlmutter, Co. Kildare (IE)

(73) Assignees: National University of Ireland Maynooth, Maynooth (IE); Cold Spring Harbor Laboratory, Cold Spring Harbor, NY (US)

( * ) Notice: Subject to any disclaimer, the term of this patent is extended or adjusted under 35 U.S.C. 154(b) by 332 days.

(21) Appl. No.: 10/809,285

(22) Filed: Mar. 24, 2004

(65) Prior Publication Data

US 2005/0213777 A1 Sep. 29, 2005

(51) Int. Cl.
*G06F 15/00* (2006.01)
*H04R 25/00* (2006.01)

(52) U.S. Cl. ...................................... 702/190; 381/313

(58) Field of Classification Search ................ 702/190, 702/197; 381/94.1, 66, 312, 313, 356; 367/99; 704/227, 200, 200.1, 203
See application file for complete search history.

(56) References Cited

U.S. PATENT DOCUMENTS 5,325,436 A * 6/1994 Soli et al. .................. 381/313
5,793,875 A * 8/1998 Lehr et al. .................. 381/313
6,002,776 A * 12/1999 Bhadkamkar et al. ........ 381/66
6,285,766 B1 * 9/2001 Kumamoto .................. 381/17
6,317,703 B1 11/2001 Linsker
6,526,148 B1 2/2003 Jourjine et al.
6,751,325 B1 * 6/2004 Fischer ....................... 381/313
6,950,528 B2 * 9/2005 Fischer ....................... 381/92
6,963,649 B2 * 11/2005 Vaudrey et al. ............ 381/94.7
6,987,856 B1 * 1/2006 Feng et al. .................. 381/92
7,142,677 B2 * 11/2006 Gonopolskiy et al. ........ 381/92
7,149,320 B2 * 12/2006 Haykin et al. .............. 381/320
2005/0060142 A1 * 3/2005 Visser et al. ............... 704/201

OTHER PUBLICATIONS

Jang et al., A Maximum Likelihood Approach to Single-Channel Source Separation, Dec. 2003, Journal of Machine Learning Research, vol. 4, pp. 1365-1392.*

Jang et al., A Subspace Approach to Single Channel Separation Using Maximum Likelihood Weighting Filters, 2003 IEEE, pp. 45-48.*

(Continued)

*Primary Examiner*—Donald E. McElheny, Jr.
*Assistant Examiner*—Toan M. Le
(74) *Attorney, Agent, or Firm*—Ropes and Gray LLP

(57) ABSTRACT

Systems and methods for performing source separation are provided. Source separation is performed using a composite signal and a signal dictionary. The composite signal is a mixture of sources received by a sensor. The signal dictionary is a database of filtered basis functions that are formed by the application of directional filters. The directional filters approximate how a particular source will be received by the sensor when the source originates from a particular location. Each source can be characterized by a coefficient and a filtered basis function. The coefficients are unknown when the sources are received by the sensor, but can be estimated using the composite signal and the signal dictionary. Various ones of the sources may be selectively reconstructed or separated using the estimated value of the coefficients.

53 Claims, 5 Drawing Sheets

OTHER PUBLICATIONS

Delfosse et al., Adaptive Blind Separation of Convolutive Mixtures, 1996 IEEE, pp. 341-345.*

Aichmer et al., Time Domain Blind Source Separation of Non-Stationary Convolved Signals by Utilizing Geometric Beamforming, 2002 IEEE, pp. 445-454.*

Bell, Anthony, et al., "The 'Independent Components' of Natural Scenes are Edge Filters", Vision Research, vol. 37(23), pp. 3327-3338, 1997.

Bofill, Paul, et al., "Underdetermined Blind Source Separation Using Sparse Representations", Signal Processing, vol. 81(11), pp. 2353-2362, 2001.

Cauwenbergs, G., "Monaural Separation of Independent Acoustical Components", In Proceeding IEEE International Symposium on Circuits and Systems (ISCSS'99), Orlando, Florida, vol. 5 of 6, pp. 62-65, 1999.

Chen, Scott Shaobing, et al., "Atomic Decomposition by Basis Pursuit", SIAM Journal on Scientific Computing, vol. 20(1), pp. 33-61, 1999.

Donoho, D.L., et al., "Optimally Sparse Representation in General (nonorthogonal) dictionaries via 11 minimization", Proceedings of the National Academy of Sciences, vol. 100, pp. 2197-2202, Mar. 2003.

Fletcher, R., "Semidefinite Matrix Constraints in Optimization", SIAM Journal of Control and Optimization, vol. 23, pp. 493-513, 1985.

Hochreiter, Sepp., et al., "Monaural Separation and Classification of Mixed Signals: A support-vector regression Perspective", 3rd International Conference on Independent Componenet Analysis and Blind Signal separation, San Diego, California, December 9-12, pp. 498-503, 2001.

Hofman, P.M., et al., "Bayesian Reconstruction of Sound Localization Cues from Responses to Random Spectra", Biological Cybernetics, vol. 86(4), pp. 305-316, 2002.

Hofman, P.M., et al., "Relearning Sound Localization with New Ears", Nature Neuroscience, vol. 1(5), pp. 417-421, 1998.

Jang, Gil-Jin, et al., "A Maximum Likelihood Approach to Single-Channel Source Separation", Journal of Machine Learning Research, vol. 4., pp. 1365-1392, Dec. 2003.

King, A.J., et al., "Plasticity in the Neural Coding of Auditory Space in the Mammalian Brain", Proc. National Academy of Science in the USA, vol. 97(22), pp. 11821-11828, 2000.

Knudsen, E.I., et al., "Mechanisms of Sound Localization in the Barn Owl", Journal of Comparative Physiology, vol. 133, pp. 13-21, 1979.

Kukkarni, A., et al., "Role of Spectral Detail in Sound-Source Localization", Nature, vol. 396(6713), pp. 747-749, 1998.

Lee, T.W., et al., "Blind Source Separation of More Sources than Mixtures Using Overcompete Representations", IEEE Signal Processing Letters, vol. 4(5),pp. 87-90, 1999.

Lewicki M.S., et al., "Learning Overcomplete Representations", Neural Computation, vol. 12(2), pp. 337-365, 2000.

Lewicki, M., et al., "Inferring sparse, Overcomplete Image Codes Using an Efficient Coding Framework", In Advances in Neural Information Processing Systems 10, pp. 815-821, MIT Press, 1998.

Linkenhoker, B.A., et al., "Incremental Training Increases the Plasticity of the Auditory Space Map in Adult Barn Owls", Nature, vol. 419(6904), pp. 293-296, 2002.

Olshausen, B.A., et al., "A new Window on Sound", Nature Neuroscience, vol. 5, pp. 292-293, 2002.

Olshausen, B., et al., "Emergence of Simple-Cell Receptive Field Properties by Learning a Sparse Code for Natural Images", Nature, vol. 381, pp. 607-609, 1996.

Olshausen, B.A., et al., "Sparse Coding with an Overcomplete Basis Set: A Strategy Employed by V1?", Vision Research, vol. 37(23), pp. 3311-3325, 1997.

Poggio, Tomaso., et al., "Computational Vision and Regularization Theory", Nature, vol. 317(6035), pp. 314-319, 1985.

Rickard, Scott, et al., "DOA Estimation of Many W-disjoint Orthogonal Sources from Two Mixtures Using DUET", In Proceedings of the 10th IEEE Workshop on Statistical Signal and Array Processing (SSAP2000), Pocono Manor, PA, pp. 311-314, Aug. 2000.

Riesenhuber, Maxmilian., et al., "Models of Object Recognition", Nature Neuroscience, Supplement, vol. 2, pp. 1199-1204, 2000.

Roweis, Sam T., "One Microphone Source Separation", Advances in Neural Information Processing Systems, pp. 793-799, MIT Press, 2001.

Shinn-Cunningham, B.G., "Models of Plasticity in Spatial Auditory Processing", Audiology and Neuro-Otology, 2001, pp. 187-191, vol. 6(4).

Wenzel, E.M., et al., "Localization Using Nonindividualized Head-Related Transfer Functions", Journal of the Acoustic Society of America, vol. 94(1), pp. 111-123, 1993.

Wightman, F.L., et al., "Headphone Simulation of Free-Field Listening, II: Psychophysical Validation", Journal of the Acoustical Society of America, vol. 85(2), pp. 868-878, 1989.

Yost, Jr., W.A., et al., "A Simulated 'cocktail party' With Up to Three Sound Sources", Percept Psychophys, vol. 58(7), pp. 1026-1036, 1996.

Zibulevsky, Michael, et al., "Blind Source Separation by Sparse Decomposition in a Signal Dictionary", Neural Computation, vol. 13(4), pp. 863-882, Apr. 2001.

* cited by examiner

SYSTEMS AND METHODS FOR SEPARATING MULTIPLE SOURCES USING DIRECTIONAL FILTERING

BACKGROUND OF THE INVENTION

The present invention relates to systems and methods for processing multiple sources, and more particularly to separating the sources using directional filtering.

There may be instances in which there are several sources emitting signals. The combination of these sources typically forms a composite signal (e.g., a signal representing a mixture of these sources) that may be received by a sensor. While there are many applications for the received composite signal, such as amplification, it is sometimes desirable to selectively isolate or separate sources in the composite signal. This problem of separating sources is sometimes referred to as the "cocktail party problem" or "blind source separation."

For example, in an acoustic environment, hearing aids may be used to amplify sounds for the benefit of the user. However, because hearing aids receive all sound impinging on its receiver, it amplifies desired sounds (e.g., conversation) and undesired sounds (e.g., background noise). Such amplification of all received sounds may make it more difficult for the user to hear. Therefore, hearing aids have been designed to filter out background noise (e.g., undesired sources) while allowing speech and other sounds (e.g., desired sources) to pass through to the user. One way to accomplish this is to separate the sources of sound being received by the hearing aid, reconstruct the desired sources, and transmit the reconstructed sources to the user.

As another example, source separation may be used to separate radio signals being emitted by different transmitters.

Several approaches have been undertaken to separate sources through the use of machines, mathematical models, algorithms, and combinations thereof, but these approaches have achieved limited success or are bound by restrictive operating conditions. Some approaches require use of multiple sensors (e.g., microphones) in order to separate sources. Such an approach relies on the relative attenuation and delay from each source as received by the multiple sensors. Use of multiple sensors is described, for example, in U.S. Pat. Nos. 6,526,148 and 6,317,703. Although these multiple sensor techniques may be used to separate sources, they fail when used in connection with a single sensor.

Single sensor source separation techniques have been attempted, such as those described in the *Journal of Machine Learning Research* (hereinafter "JMLR"), Vol. 4, 2003, and in particular, pages 1365-1392, and in *Advances in Neural Information Processing Systems* (hereinafter "ANIPS"), Vol. 13, 2001, and in particular, pages 793-799, but these techniques require detailed knowledge of the sources and fail to use directional filtering as a cue in performing source separation.

While existing machine/algorithm combinations strive to achieve source separation, organisms on the other hand, such as mammals, have an innate ability to distinguish among many different sources, even when placed in a noisy environment. The auditory processing functions of an organism's brain separate and identify which sounds belong to which sources. For example, a person placed in a noisy environment may hear many different types of sounds, yet still be able to identify the source (e.g., the radio, the person talking, etc.) of each of these sounds.

Organisms accomplish source separation by localizing sound sources using a variety of binaural and monaural cues. Binaural cues can include intra-aural intensity and phase disparity. Monaural cues can include directional filtering. Directional filtering is typically performed by the organism's ears. That is, the ears "directionalize" sounds based on the location from which the sounds originate. For example, a "bop" sound originating from the front of a person sounds different from the same "bop" sound originating from the right side of a person. This is sometimes referred to as the "head and pinnae" relationship, where the head is the sensor and the pinnae is the location of the source. These differences in sound, depending on the location in which the sound source is located, are used as spatial cues by the organism's auditory system to separate the sources. In other words, the ears directionalize each source based on its location and transmit the directionalized (e.g., filtered) sound information to the brain for use in source separation.

Therefore, it is an object of the invention to provide systems and methods that overcome the deficiencies of the aforementioned source separation techniques and that utilize directional filtering to accurately and quickly separate sources.

It is another object of the invention to separate sources using just one sensor.

SUMMARY OF THE INVENTION

These and other objects of the invention are accomplished by providing systems and methods that use directional filters to perform source separation. The composite signal received by the sensor can be characterized mathematically to represent the sum of the filtered sources. Each source can be represented mathematically as the weighted sum of basis waveforms, with the weights (coefficients) being sufficient to characterize the source. The basis waveforms can be filtered, so the same coefficients represent the source before and after the transformation between the transmitter and the sensor, using a different set of basis waveforms. The transformation itself, is based on, for example, the location of the source, the environment (e.g., a small room as opposed to a large room), reverberations, signal distortion, and other factors.

The directional filters are used to approximate these transformations. More particularly, directional filters may be used to generate signal dictionaries that include a set of filtered basis signals. Thus, when the composite signal is received, source separation is performed using the composite signal and the signal dictionary to estimate the value of the coefficients. The estimated value of the coefficients is used to selectively reconstruct one or more sources contributing to the composite signal.

Two different "types" of reconstructed sources can be obtained in accordance with the invention. One type refers to source reconstruction of sources received by the sensor. Hence, this "sensor type" reconstruction reconstructs sources that have undergone transformation. Another type refers to source reconstruction of sources being emitted substantially directly from the source itself. This "source type" reconstruction reconstructs sources that have not undergone a transformation. Source type reconstructed sources are "de-echoed."

An advantage of the invention is that source separation can be performed with the use of just one sensor. The elimination of the need to use multiple sensors is beneficial, especially when considering the miniaturization trend seen in conventional electronic applications. However, if desired, source separation can also be performed using multiple sensors.

Further features of the invention, its nature and various advantages will be more apparent from the accompanying drawings and the following detailed description of the preferred embodiments.

DETAILED DESCRIPTION

In accordance with the present invention, systems and methods are provided to separate multiple sources using cues derived from filtering imposed by the head and pinnae on sources located at different positions in space. The present invention operates on the assumption that each source occupies a particular location in space, and that because each source occupies a particular location, each source exhibits properties or characteristics indicative of its position. These properties are used as cues in enabling the invention to separate sources.

Figure 1:
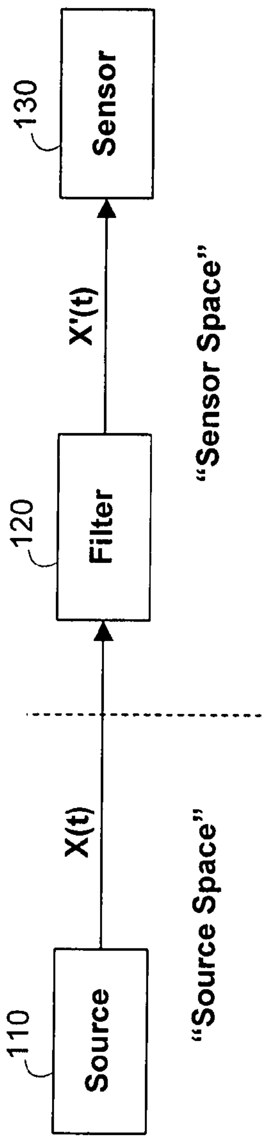
FIG. 1 shows a block diagram that illustrates transformation of a source in accordance with the principles of the invention.

Referring to FIG. 1, source 110 emits a signal, represented here as x(t). Sensor 130 typically does not receive x(t) exactly as it is emitted by source 110, but receives a filtered version of x(t), x'(t). That is, x(t) typically undergoes a transformation, as indicated by filter 120, as it travels from the source to the sensor, resulting in x'(t). Several factors may contribute to the transformation or filtering of x(t). For example, the environment, reverberations, distortion, echoes, delays, frequency-dependent attenuation, and the location of the source may be factors accounting for the transformation of the source x(t).

The present invention approximates the transformation process of signals through the application of directional filters such as head-related transfer functions ("HRTFs"). In general, directional filters modify a source x(t) according to its position to generate a filtered source x'(t). An advantage of directional filters is that they can be used to incorporate factors, as mentioned above, that affect a source x(t). Using these directional filters, the present invention generates signal dictionaries that hypothesize how each source x(t) will be received by a sensor after that source has undergone a transformation. The invention is then able to separate the sources utilizing the signal dictionary and a composite signal received by the sensor.

FIG. 1 also shows two different domains, "source space" and "sensor space," that will be referred to herein. Source space is source-oriented and refers to sources that have not been subject to filtering, indicating that the signals emitted by sources have not undergone a transformation. Sensor space is sensor-oriented and refers to sources that have undergone transformation and are received by the sensor. One advantage of the invention is that it can reconstruct sources in sensor space, source space, or both.

Figure 2:
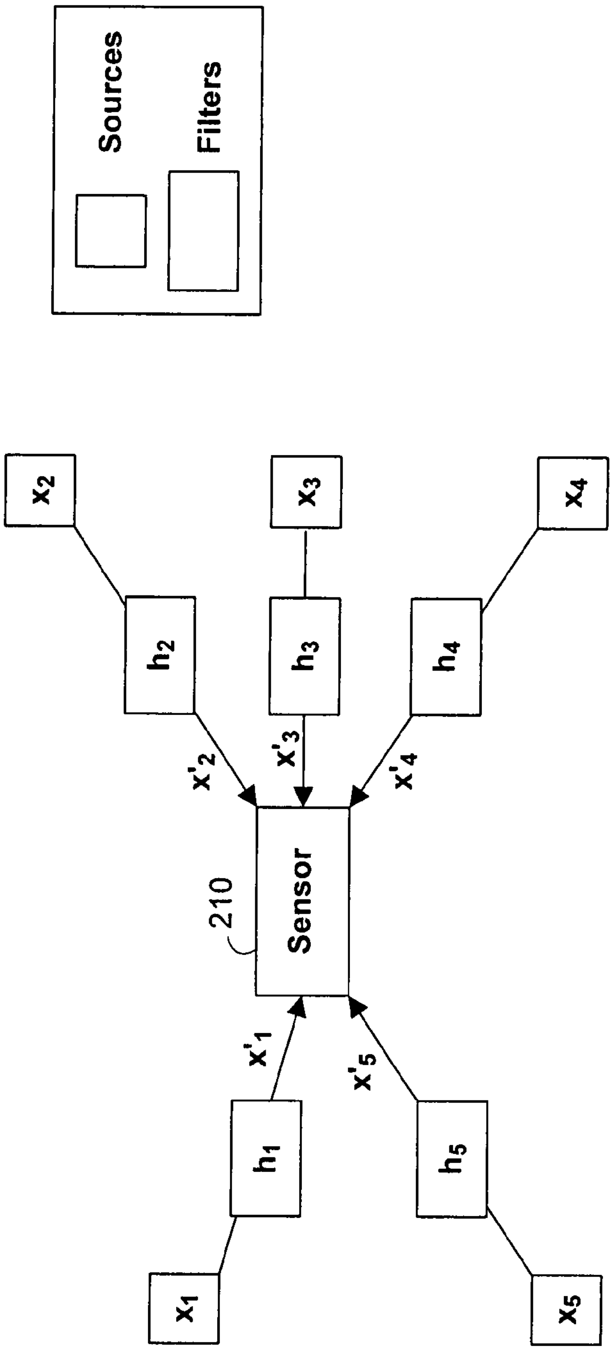
FIG. 2 shows a block diagram of multiple sources that are each located in a particular location and being received by a sensor in accordance with the principles of the invention.

FIG. 2 shows an illustration of multiple sources $x_1$-$x_5$ disposed in distinct locations about sensor 210. This illustrates an assumption of the invention that each source occupies a distinct position in space, and has a corresponding directional filter, shown as $h_1$-$h_5$. Sources $x_1$-$x_5$ may simultaneously emit signals that are being received by sensor 210. The combination or mixture of the signals being emitted by sources $x_1$-$x_5$ may form a composite signal, which is received by sensor 210.

The composite signal y(t) received by sensor 210 can be defined by the sum of filtered sources:

$$y(t) = \sum_{i=1}^{N} h_i(t) * x_i(t) \tag{1}$$

where * indicates convolution, $h_i(t)$ represents a directional filter of the ith source, and $x_i(t)$ represents the ith source. Note that (t) indicates that the signals are time-varying signals. Persons skilled in the art will appreciate that the relationship defined in equation 1 is not absolute, but merely illustrative. Moreover, even though equation 1 represents the time-domain, persons skilled in the art will appreciate that source separation can be performed in a transform domain such as the frequency domain.

Equation 1 illustrates a general framework from which the sources are separated. Sources $x_i(t)$ can be reconstructed from the composite signal y(t) received by sensor 210 using the knowledge of the directional filters $h_i(t)$. To illustrate this point, FIG. 2 shows that each source $x_1$-$x_5$ undergoes transformation by its respective filter $h_1$-$h_5$. The resulting filtered sources $x'_1$-$x'_5$ are received by sensor 210 as a composite signal y(t). Thus, the composite signal y(t), which is the summation of the filtered sources, is known and is used as a known variable in source separation. Because each source exhibits certain properties based on its location, these properties can be approximated by directional filters $h_1$-$h_5$. The directional filters provide another known variable that can be used in source separation. Thus, the sources can be separated using the composite signal and knowledge obtained from the directional filters.

An advantage of the invention is that it can separate many types of signals. For example, the signals can include, but are not limited to, acoustic signals, radiowaves, light signals, nerve pulses, electromagnetic signals, ultrasound waves, and other types of signals. For the purposes of clarity and simplicity, the various embodiments described herein refer to acoustic or sound sources.

A source $x_i(t)$ can be represented as the weighted sum of many basis signals $$x_i(t) = \sum_j c_{ij} d_i(t) \tag{2}$$

where the weighting of a particular basis signal's (i.e., $d_j(t)$) contribution to source i is $c_{ij}$. The coefficient $c_{ij}$ typically represents the amplitude (e.g., volume) of the source. The signal $d_j(t)$ represents a "pure" or unfiltered signal (i.e., a representation of a signal as it is emitted substantially directly by the source). Note the relationship shown in equation 2 is merely illustrative of one way to define a source and that it is understood that there are potentially endless variations in defining sources.

Because it is known that the composite signal is the sum of the filtered sources, equation 2 can be rewritten as $$y(t) = \sum_{ij} h_i(t) * c_{ij} d_{ij}(t) = \sum_{ij} c_{ij} d'_{ij}(t) \tag{3}$$

where $d'_{ij}(t)=h_i(t)*d_j(t)$ is introduced to represent filtered copies of $d_j$ (t). The filtered signal $d'_{ij}(t)$ represents a hypothesis of how a signal sounds if it originates from a particular location. Thus, the directional filter modifies the properties of the signal to take on the properties of a signal originating from a particular location.

Equation 3 illustrates a more specific framework from which the invention can separate sources. Equation 3 shows three variables, y(t), $c_{ij}$, and $d'_{ij}(t)$. Two of these three variables are known: y(t), which is the composite signal received by the sensor, and $d'_{ij}$(t, which is an entry in a signal dictionary. (Signal dictionaries are discussed below). Because there is only one unknown in an equation of three variables, the unknown variable, $c_{ij}$, can be solved. The invention can use mathematical techniques to solve for the unknown variables. For example, the unknown coefficients can be solved using linear algebra. When the coefficients are solved, the invention can reconstruct one or more desired sources forming the composite signal.

In general, signal dictionaries include many different signals. The present invention may use two different signal dictionaries: a pre-filter signal dictionary and a post-filter signal dictionary. Construction of the signal dictionaries is variable. For example, they may be generated as part of a pre-processing step (e.g., prior to source separation) or they may be generated, updated, or modified while performing source separation. Furthermore, the signal dictionaries may be subject to several predefined criteria while being constructed (discussed below).

Figure 3:
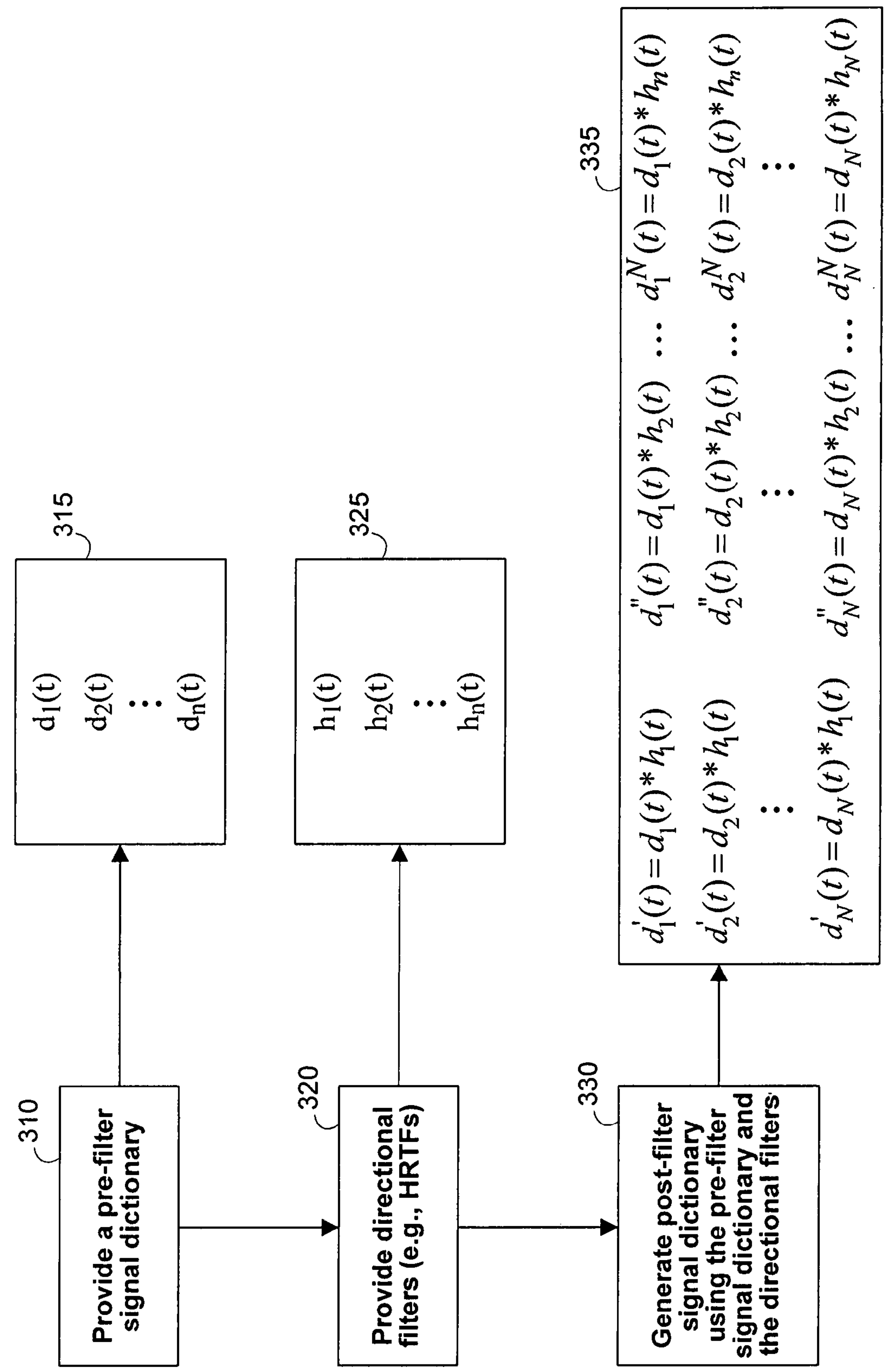
FIG. 3 shows a flowchart for generating a signal dictionary in accordance with the invention.

FIG. 3 shows steps for generating a post-filter signal dictionary that enables the invention to separate sources in accordance with the principles of the present invention. Step 310 shows that a pre-filter signal dictionary is provided. A pre-filter signal dictionary includes a predetermined number of basis functions, d(t), as shown in box 315. Each basis function represents a brief waveform of which a reasonably small number can be combined to form a signal of interest. Moreover, each basis function may represent a brief waveform as it is emitted substantially directly from a source, irrespective of the source's location. Thus, a basis function forms part of a source. For example, the $d_{ij}(t)$ in equation 2 may be duplicated in the pre-filter signal dictionary.

The basis functions may be chosen based on two criteria. First, sources are preferably sparse when represented in the pre-filter signal dictionary. In other words, in a sparse representation, the coefficients $c_{ij}$ used to represent a particular source $x_i(t)$ have a distribution including mostly zeros and "large" values. An example of such a distribution of coefficients can be governed by a Laplacian distribution. A Laplacian distribution, as compared to a Gaussian distribution, has a "fatter tail" and therefore corresponds to a sparser description.

Second, basis functions $d_j$ (t) may be chosen such that, following transformation by a filter (e.g., a HRTF filter), the resulting filtered copies of a particular basis function differ as much as possible. This improves the accuracy of the estimated coefficients.

It is noted that methods and techniques for constructing pre-filter signal dictionaries are known by those with skill in art and need not be discussed with more particularity. See, for example, *Neural Computation* (Vol. 13, No. 4, 2000 and in particular pp. 863-882) for a more detailed discussion of signal dictionaries.

At step 320, the directional filters are provided. Directional filters may modify the basis functions of the pre-filter signal dictionary so that the modified basis functions take on properties indicative of such basis functions being emitted by a source positioned at a particular location. The number of directional filters provided and the complexity of directional filters may vary depending on any number of factors, including, but not limited to the type of signals emitted by the sources, the number of sensors used, and pre-existing knowledge of the sources. Box 325 shows that a predetermined number of filters may be provided.

At step 330, a post-filter signal dictionary is generated using the pre-filter signal dictionary and the directional filters. A post-filter signal dictionary includes copies of each basis function as filtered by each filter (provided at step 320). Each element of the post-filter signal dictionary is a filtered basis function, which is denoted by $d'_{ij}(t)=h_i*d_j(t)$. Thus, each filtered basis function approximates how a particular basis function is received (by a sensor) if that basis function originates from a source at a particular location. Box 335 shows filtered basis functions that can be obtained by convolving the contents of boxes 315 and 325.

The elements of the post-filter signal dictionary may represent filtered signals $d'_{ij}(t)$ forming part of the composite signal received by the sensor. Therefore, if the filtered signals are contained within the post-filter signal dictionary, this provides a known variable that can be used to separate the sources.

Figure 4:
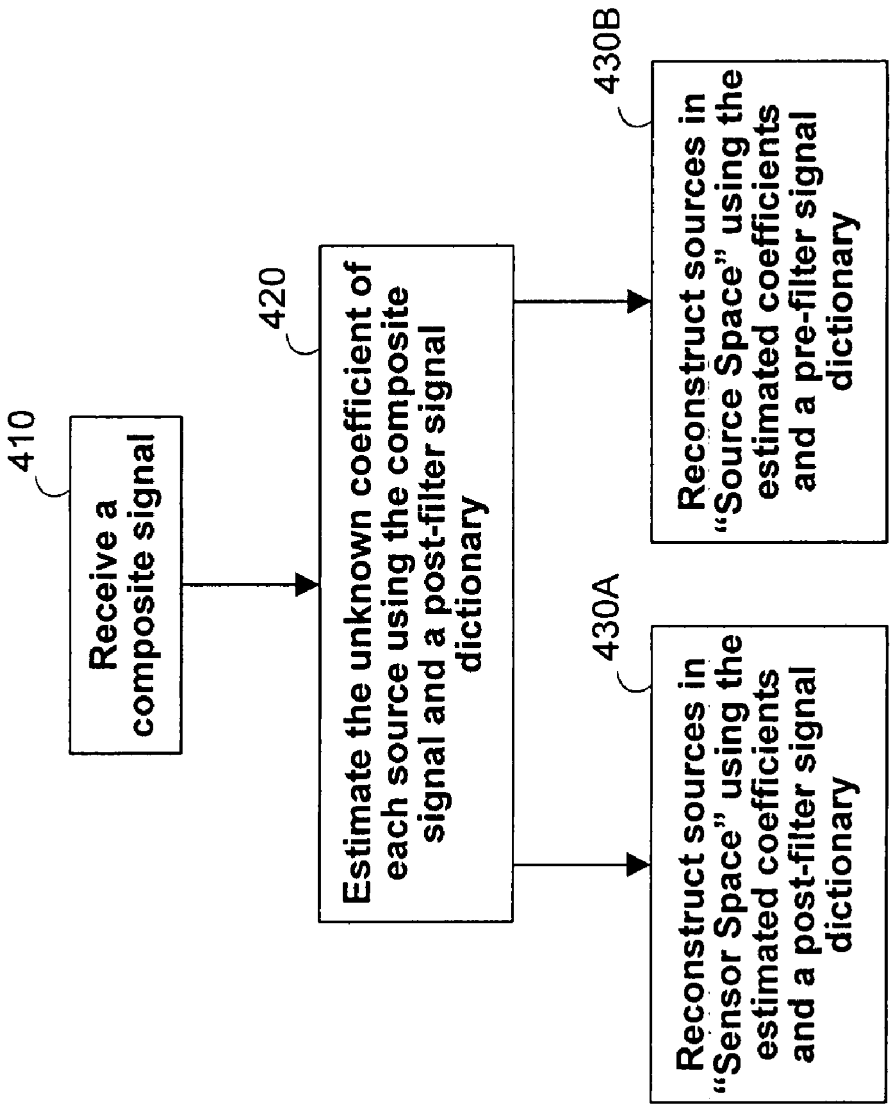
FIG. 4 shows a flowchart for separating sources in accordance with the invention.

FIG. 4 shows a flow chart illustrating the steps of separating sources in accordance with the principles of the invention. Beginning at step 410, the sensor receives a composite signal. As stated above in connection with equation 3, the composite signal is the sum of the filtered sources, where each filtered source is further characterized as having at least one filtered basis function (signal) and at least one coefficient corresponding to each filtered basis function (signal).

At step 420, the coefficient of each source is estimated using the composite signal and the post-filter signal dictionary that was generated through the application of directional filters. This step can be performed by solving for the coefficients $c_{ij}$ in, for example, equation 3. The coefficient $c_{ij}$ is solvable because the composite signal is known and the filtered basis functions, which may be provided in the post-filter signal dictionary, are also known. Persons skilled in the art will appreciate that there are several different approaches for solving for each coefficient. For example, in one approach, a sparse solution of the coefficients may be solved. In another approach, a convex solution of the coefficients may be solved.

To solve for the coefficients, the composite signal may be characterized as a mathematical equation using some form of the relationship y=Dc. This can be accomplished by separating y(t) into discrete time slices or samples t1, t2, . . . tM. This is sometimes referred to as descretizing the signals. Once descretized, equation 3 can be rewritten in matrix form, as shown in equation 4:

$$y=Dc \tag{4}$$

where c is defined as single column vector containing all coefficients $c_{ij}$, with the elements indexed by i and j, and D is a matrix whose k-th row holds the elements $d'_{ij}(t_k)$. The columns of D are indexed by and i and j, and the rows are indexed by k. Y is a column vector whose elements correspond to the discrete-time sampled elements y(t).

The coefficients can be obtained by solving for c in equation 4. The y variable is known because it is obtained from the received composite signal y(t) and the D variable is known because is provided by a signal dictionary (e.g., a post-signal dictionary from step 330 of FIG. 3) generated through the application of directional filters.

An advantage of the invention is that many factors can be taken into account when solving for the coefficients while still accurately separating the sources. For example, one factor can include the knowledge or information (e.g., position of sources, the number of sources, the structure of the signals emitted by the sources, etc.) that is known about the sources. The knowledge of the sources may determine whether the source separation problem is tractable (e.g., solvable). For example, there may be instances in which there is considerable prior knowledge of the sources (in which case the source separation problem is relatively simple to solve). In other instances, knowledge of the sources is relatively weak, which is typically the case when source separation is being used in practice (e.g., blind source separation).

The techniques used to solve for c may vary depending on the post-filter signal dictionary. For example, if the signal dictionary forms a complete basis, c can be obtained from $c=D^{-1}y$. A signal dictionary that forms a complete basis may be provided when the prior knowledge of the sources is substantial (e.g., the position of each source is known). In a complete basis, there is a one-to-one correspondence of filtered basis functions in the signal dictionary to filtered basis functions received in the composite signal.

However, in the case where the post-filter signal dictionary forms an overcomplete basis, many different solutions for c may be obtained. This is sometimes the case when the knowledge of the sources is relatively weak. The solutions may be obtained solving for c, for example, in the pseudo-inverse $c=D^*y$. An overcomplete post-filter signal dictionary includes more filtered basis functions then necessary to solve for the coefficients. This excess results in a system that is underdetermined (i.e., there are many possible combinations of filtered basis functions that can be used to replicate sources in the composite signal y(t).)

In the undetermined case, it is desirable to select a solution with the highest log-probability corresponding to the sparsest solution. This can be accomplished by introducing a regulariser that introduces an assumption that the coefficients can be represented as a distribution (e.g., a Gaussian, Laplacian, or Bayesian distribution). This assumption can be expressed as condition on the norm of the c vector (in equation 4). The condition can require, for example, a c to be found that minimizes the $L_p$ norm $\|c\|_p$ subject to Dc=y, where $$\|c\|_P = \left(\sum_{ij} |c_{ij}|^P\right)^{\frac{1}{P}} \quad (5)$$

Thus, different choices of p (e.g., a p of 0, 1, or 2) correspond to different assumptions (e.g., distributions) and yield different solutions. For example, if p is 1, the following condition is solved $$\text{minimize} \sum_{ij} \|c_{ij}\| \text{ subject to } y = DC \quad (6)$$

It will be understood that the condition set forth in equation 11 can be determined using linear programming. Thus is seen that the regulariser provides the prior knowledge of the sources needed to solve for the coefficients when no such prior information is actually known.

It is understood that the condition Dc=y can be relaxed. That is, the $L_p$ norm of c can be determined if Dc=y is approximately matched, as opposed to being exactly matched. Relaxing this constraint advantageously enhances the robustness of the source separation algorithm according to the invention, thereby enhancing it applicability to source separation problems.

For example, relaxing the constraint provides source separation in the presence of noise. Noise may be attributed to the sensor, itself (e.g., caused by sensor design limitations), or to ambient noise impinging on the sensor. Noise can be taken into account by modifying equation 6 to include a noise process to $$\text{minimize } \|c\|_1 \text{ subject to } \|DC-y\|_p \leqq \beta \quad (7)$$

where β is proportional to a noise level and p=1, 2, or ∞.

Another technique to compensate for noise is to introduce a vector e of "error slop" variables in the optimization (of equation 6). The magnitude of the "error slop" variables is controlled by an allowable parameter ϵ. This error vector is then incorporated into a modified form of equation 6 such that objective is to either $$\text{minimize } \|c\|_1 \text{ subject to } y=Dc+e \text{ and } \|e\|_1 \leqq \epsilon \quad (8)$$

or $$\text{minimize } \|c\|_1 \text{ subject to } y=Dc+e \text{ and } \|e\|_\infty \leqq \epsilon \quad (9)$$

or $$\text{minimize } \|c\|_1 \text{ subject to } y=Dc+e \text{ and } \|e\|_2 \leqq \epsilon \quad (10)$$

all of which can be used to solve unique solutions of the unknown coefficients.

When the coefficients are obtained, the sources may be reconstructed. Steps 430A and 430B show reconstruction of the sources in "sensor space" and in "source space," respectively. Either one or both reconstruction steps may be performed to reconstruct the source.

"Sensor space" reconstruction of step 430A reconstructs filtered sources. Such reconstruction can be performed using the following equation:

$$y_i(t)=c_{ij}d'_{ij}(t) \quad (11)$$

where $y_i(t)$ is the particular source being reconstructed in "sensor space," $c_{ij}$ represents the coefficients estimated for this source (in step 420), and $d'_{ij}$ represents the filtered basis functions of this source.

"Source space" reconstruction of step 430B reconstructs sources as if each source had not been filtered, but as if the source was emitted substantially directly from the source. An advantage of source separation is that it "de-echoes" each of the reconstructed sources because there is no need to use the post-filter signal dictionary. "Source space" reconstruction reconstructs each source using the estimated coefficients (obtained from step 420) and the basis functions of the pre-filter signal dictionary. For example, a de-echoed source can be reconstructed using equation 2.

Figure 5:
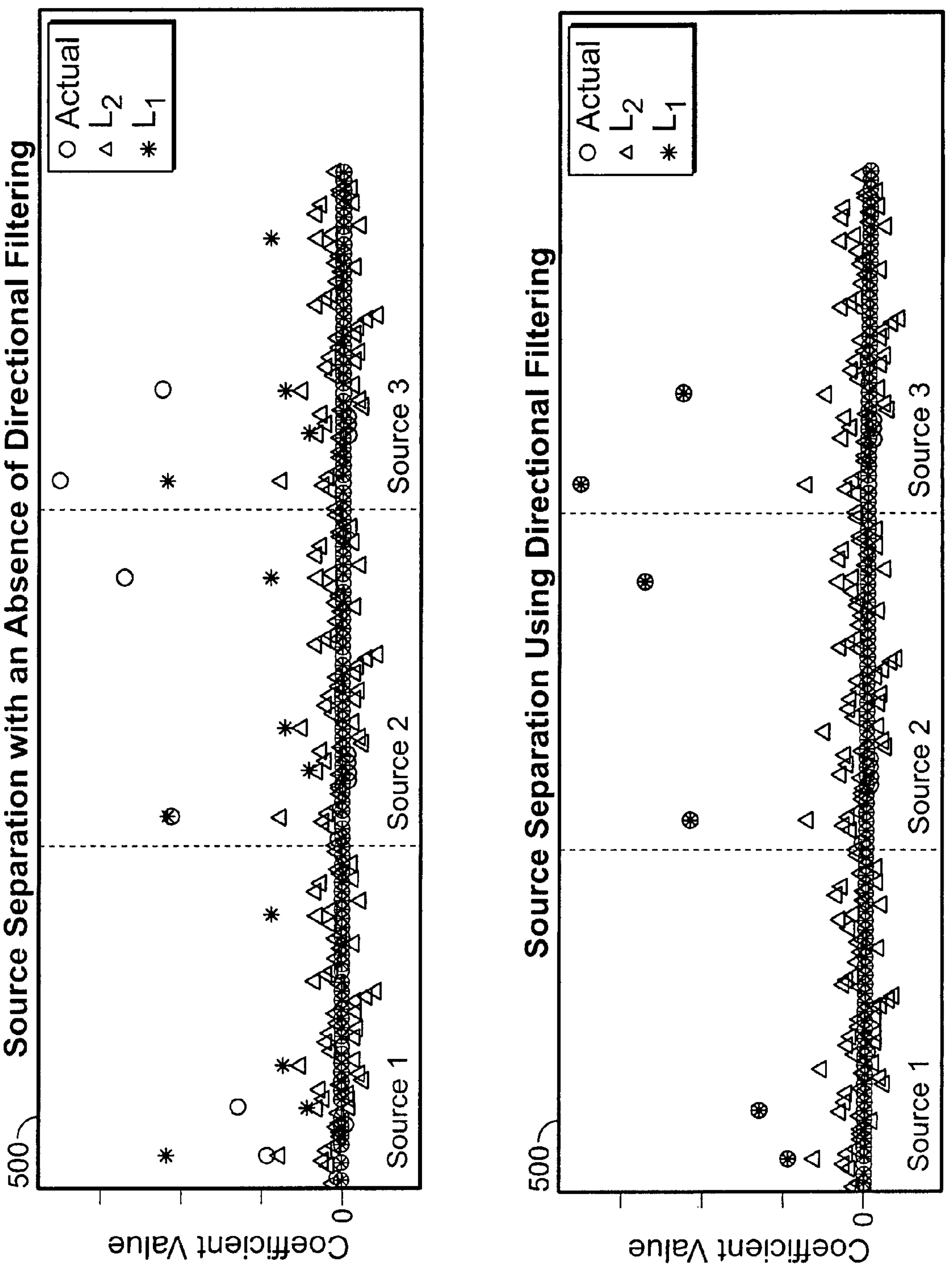
FIG. 5 shows two illustrative graphs depicting the results of source separation, with one graph showing results without using directional filtering and the other showing results using directional filtering in accordance with the invention.

FIG. 5 shows two graphs illustrating how the invention can separate sources in an acoustic environment. Graph 500 shows the results of source separation without the use of directional filters and graph 550 shows the results of source separation with the use of directional filters.

Graphs 500 and 550 both show sources 1, 2, and 3 on the x-axis and the amplitudes of notes played by each source on the y-axis. Both graphs also show the actual coefficients, a L1 norm of the coefficients, and a L2 norm of the coefficients. The L1 and L2 norms refer to the minimization condition, shown in equation 7, where L1 (p=1) refers to a Laplacian assumption and L2 (p=2) refers to a Gaussian assumption.

For purposes of illustration assume that each source can play notes drawn from a 12-tone (Western) scale. Further assume that each source occupies an unknown location and simultaneously plays two notes. The actual values of these two notes are shown by the circles in graphs 500 and 550. Each note has a fundamental frequency F and has harmonics thereof nF (n being 2, 3, . . . n). The amplitude of the harmonics is defined by 1/n. Thus, the basis functions included in the pre-filter signal dictionary may be defined by $$d_i = \sum_{n=1} \frac{1}{n} \sin(2\pi n F_i t) \tag{12}$$

where $F_i = 2^{i/12} F_o$ is the fundamental frequency of the ith note, and $F_o$ is the frequency of the lowest note.

In graph 600, in which no directional filtering is used, both the L1 and L2 norms were not able to accurately determine the coefficients. Because no directional filters were used, the solutions were obtained using the pseudo-inverse of the pre-filter signal dictionary. The L2 norm solution resulted in a Gaussian distribution of the coefficients, all of which are incorrect. The L1 norm solution resulted in a sparse solution for the non-zero coefficients, but the absence of the post-filter signal dictionary prevented the solution from being able to correctly identify all of the coefficients.

Graph 550 shows that the use of directional filtering enhances source separation. In this case the L1 and L2 norms operated in connection with a post-filter signal dictionary. Graph 550 shows that the L1 norm is able to accurately separate the sources, while the L2 norm solution remained poor. The difference in the performance of the norms shows that a sparseness assumption, expressed as a distribution over the sources, enable source separation to be performed accurately.

Figure 6:
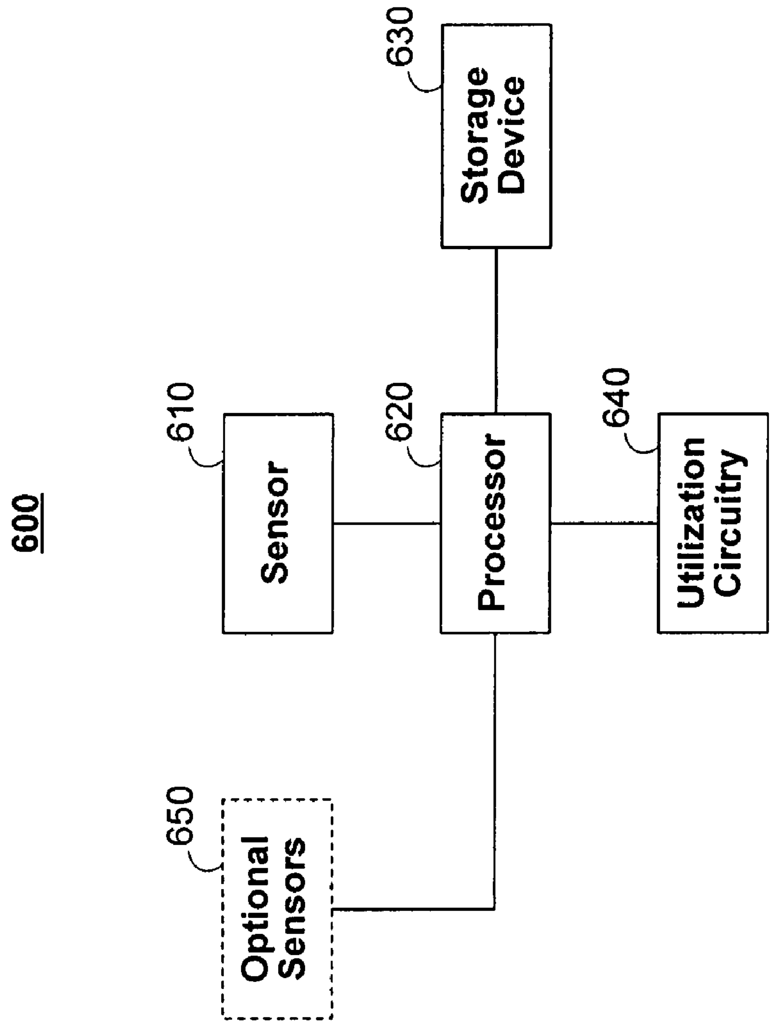
FIG. 6 shows an illustrative system for performing source separation in accordance with the invention.

FIG. 6 shows an illustrative system 600 that utilizes the source separating algorithm in accordance with the principles of the invention. System 600 may include sensor 610, processor 620, storage device 630, and utilization circuitry 640. Processor 620 may communicate with sensor 610, storage device 630 and utilization circuitry 640 via communications bus 660.

It will be understood that the arrangement shown in FIG. 6 is merely illustrative and that additional system components may be added or existing components may be removed or integrated. For example, processor 620 and storage device 630 may be integrated into a single unit capable of providing both processing and data storage functionality. If desired, system 600 may optionally include additional sensors 650.

Sensor 610 and optional sensors 650 provide data (e.g., received auditory signals) to processor 620 via communications bus 660. The type of sensors used in system 600 may depend on the signals being received. For example, if acoustic signals are being monitored, a microphone type sensor may be used. Specific examples of such microphones may used in hearing aids or cell phones.

Processor 620 receives the data and applies a source separation algorithm in accordance with the invention to separate the sources. Processor 620 may, for example, be a computer processor, a dedicated processor, a digital signal processor, or the like. Processor 620 may perform the mathematical computations needed to execute source separation. Thus, the processor solves for the unknown coefficients using the data received by sensor 610. In addition, processor 620 may, for example, access information (e.g., a post-filter signal dictionary) stored at storage device 630 when solving for the unknown coefficients.

Storage device 630 may include hardware such as memory, a hard drive, or other storage medium capable of storing, for example, pre- and post-filter signal dictionaries, directional filters, algorithm instructions, etc.

The data stored in storage device 630 may be updated. The data may be updated at regular intervals (e.g., by downloading the data via the internet) or at the request of the user (in which case the user may manually interface system 600 to another system to acquire the updated data). During an update, improved pre-filter signal dictionaries, directional filters, or post-filter signal dictionaries may be provided.

Storage device 630 may have stored therein several pre-filter dictionaries and directional filters. This may provide flexibility in generating post-filter signal dictionaries that are specifically geared towards the environment in which system 600 is used. For example, system 600 may analyze the composite signal and construct a post-filter signal dictionary based on that analysis. This type of "on-the-fly" analysis can enable system 600 to modify the post-filter signal dictionary to account for changing conditions. For example, if the analysis indicates a change in environment (e.g., an indoor to outdoor change), system 600 may generate a post-filter signal dictionary according to the changes detected in the composite signal. Hence, system 600 may be programmed to use a pre-filter signal dictionary and directional filters best suited for a particular application.

Utilization circuitry 640 may apply the results of source separation to a particular use. For example, in the case of hearing aid, utilization circuitry 640 may be an amplifier that transmits the separated sources to the user's ear. If desired, system 600 may reconstruct a portion (e.g., desired sources) of the sources forming the composite signal for transmission to utilization circuitry 640.

Thus it is seen that multiple sources can be separated and reconstructed using directional dependant filtering. Those skilled in the art will appreciate that the invention can be practiced by other than the described embodiments, which are presented for purposes of illustration rather than of limitation, and the invention is limited only by the claims which follow.

What is claimed is:

1. A method for performing source separation, comprising:

receiving a composite signal of a plurality of sources, each source characterized by at least one filtered basis function and at least one coefficient;

providing a post-filter signal dictionary that includes a set of filtered basis functions, wherein at least a portion of the filtered basis functions that form part of each source is included in the dictionary; and estimating the value of the at least one coefficient of each source using the composite signal and the dictionary; and selectively reconstructing at least one source using the estimated value of the at least one coefficient.

2. The method defined in claim 1 further comprising:

providing a pre-filter signal dictionary that includes a set of basis functions;

providing at least one directional filter; and generating the post-filter signal dictionary by convolving the at least one directional filter to each basis function in the pre-filter signal dictionary.

3. The method defined in claim 2, wherein the basis functions are selected according to predetermined criteria.

4. The method defined in claim 2, wherein each basis function represents a signal originating substantially directly from a source.

5. The method defined in claim 2, wherein the at least one directional filter characterizes a basis function as if it originated from a source located in a particular location.

6. The method defined in claim 1, wherein each filtered basis function represents a signal originating from a source located in a particular location.

7. A method for performing source separation, comprising:

receiving a composite signal of a plurality of sources, each source characterized by at least one filtered basis function and at least one coefficient;

providing a post-filter signal dictionary that includes a set of filtered basis functions, wherein at least one of the filtered basis functions is derived from at least one directional filter that is a head-related transfer function;

estimating the value of the at least one coefficient of each source using the composite signal and the dictionary; and selectively reconstructing at least one source using the estimated value of the at least one coefficient.

8. The method defined in claim 1 further comprising using a sensor to receive the composite signal.

9. The method defined in claim 1 further comprising using a plurality of sensors to receive the composite signal.

10. The method defined in claim 1, wherein the step of estimating further comprises:

generating a plurality of solutions for a given one of the coefficients;

determining which one of said plurality of solutions corresponds to a most sparse solution; and assigning the most sparse solution to the given one of the coefficients.

11. The method defined in claim 1, wherein the step of estimating comprises:

generating a plurality of solutions for a given one of the coefficients;

determining which one of said plurality of solutions mostly closely satisfies predetermined criteria, said predetermined criteria including noise criteria; and assigning the solution that most closely satisfied said predetermined criteria to the given one of the coefficients.

12. The method defined in claim 1, wherein the step of selectively reconstructing comprises using the estimated value of the at least one coefficient and the post-filter signal dictionary.

13. The method defined in claim 1, wherein the step of selectively reconstructing comprises using the estimated value of the at least one coefficient and a pre-filter signal dictionary used to generate the post-filter signal dictionary.

14. The method defined in claim 1, wherein the composite signal is a signal selected from the group consisting of an acoustic signal, an electromagnetic signal, a radio signal, an ultrasonic signal, a light signal, or an electrical signal.

15. A system for performing source separation, comprising:

a sensor for receiving a composite signal of a plurality of sources, each source characterized by at least one filtered basis function and at least one coefficient; and a programmable processor electrically coupled to the sensor, the processor is operative to access a post-filter signal dictionary that includes a set of filtered basis functions, wherein at least a portion of the filtered basis functions that form part of each source is included in the dictionary; the processor is operative to estimate the value of the at least one coefficient of each source using the composite signal and the dictionary, and the processor is operative to selectively reconstruct at least one source using the estimated value of the at least one coefficient.

16. The system defined in claim 15 further comprising:

a storage device coupled to the processor, the storage device having stored therein a pre-filter signal dictionary that includes a set of basis functions and at least one directional filter.

17. The system defined in claim 16 wherein the processor is operative to generate the post-filter signal dictionary by convolving the at least one directional filter to each basis function in the pre-filter signal dictionary.

18. The system defined in claim 16, wherein the basis functions are selected to satisfy predetermined criteria.

19. The system defined in claim 16, wherein each basis function represents a signal originating substantially directly from a source.

20. The system defined in claim 16, wherein the at least one directional filter characterizes a basis function as if it originated from a source located in a particular location.

21. The system defined in claim 15, wherein each filtered basis function represents a signal originating from a source located in a particular location.

22. A system for performing source separation, comprising:

a sensor for receiving a composite signal of a plurality of sources, each source characterized by at least one filtered basis function and at least one coefficient; and a programmable processor electrically coupled to the sensor, the processor is operative to access a post-filter signal dictionary that includes a set of filtered basis functions, wherein at least one of the filtered basis functions is derived from at least one directional filter that is a head-related transfer function; the processor is operative to estimate the value of the at least one coefficient of each source using the composite signal and the dictionary, and the processor is operative to selectively reconstruct at least one source using the estimated value of the at least one coefficient.

23. The system defined in claim 15 further comprising at least a second sensor that is electrically coupled to the processor and that receives the composite signal.

24. The system defined in claim 15, wherein the processor is operative to:

generate a plurality of solutions for a given one of the coefficients;

determine which one of said plurality of solutions corresponds to a most sparse solution; and assign the most sparse solution to the given one of the coefficients.

25. The system defined in claim 15, wherein the processor is operative to selectively reconstruct at least one source using the estimated value of the least one coefficient and the post-filter signal dictionary.

26. The system defined in claim 15, wherein the processor is operative to selectively reconstruct at least one source using the estimated value of the at least one coefficient and a pre-filter signal dictionary used to generate the post-filter signal dictionary.

27. The system defined in claim 15, wherein the composite signal is a signal selected from the group consisting of an acoustic signal, an electromagnetic signal, a radio signal, an ultrasonic signal, a light signal, or an electrical signal.

28. A method for performing source separation, comprising:

generating a signal dictionary through application of at least one directional filter;

receiving a mixture of a plurality of sources, including desired sources and undesired sources; and separating said plurality of sources using elements of said signal dictionary and said mixture as variables in a set of mathematical equations that estimate the value of unknown coefficients corresponding to each of said sources.

29. The method defined in claim 28 further comprising:

reconstructing said desired sources using the estimated value of said coefficients.

30. The method defined in claim 29, wherein said reconstructing comprises using the estimated value of said coefficients and said signal dictionary to reconstruct said desired sources.

31. The method defined in claim 28, wherein said generating comprises:

providing a pre-filter signal dictionary having a set of basis functions; and applying said at least one directional filter to said set of basis functions to generate said signal dictionary, wherein said elements of said signal dictionary are filtered basis functions.

32. The method defined in claim 31, wherein said reconstructing comprises using the estimated value of said coefficients and said pre-filter signal dictionary to reconstruct said desired sources.

33. The method defined in claim 31, wherein said at least one directional filter modifies the properties of said basis functions to approximate how said basis functions are received based on a particular location in which said basis functions originate.

34. The method defined in claim 28, wherein said receiving comprises using one sensor.

35. The method defined in claim 28, wherein said receiving comprises using at least two sensors.

36. The method defined in claim 28, wherein said mathematical equations apply an L1 norm optimization condition to estimate the value of said coefficients.

37. A method for performing source separation, comprising:

generating a signal dictionary through application of at least one directional filter, wherein the at least one directional filter is a head-related transfer function;

receiving a mixture of a plurality of sources, including desired sources and undesired sources; and separating said plurality of sources using elements of said signal dictionary and said mixture as variables in a set of mathematical equations that estimate the value of unknown coefficients corresponding to each of said sources.

38. The method defined in claim 28, wherein said undesired sources comprise noise.

39. A system for performing source separation, comprising:

a sensor for receiving a mixture of a plurality of sources, including desired sources and undesired sources; and processing circuitry coupled to said sensor and operative to:

generate a signal dictionary through application of at least one directional filter; and separate said plurality of sources using elements of said signal dictionary and said mixture as variables in a set of mathematical equations that estimate the value of unknown coefficients corresponding to each of said sources.

40. The system defined in claim 39, wherein said processing circuitry is operative to:

reconstruct said desired sources using the estimated value of said coefficients.

41. The system defined in claim 39, wherein said processing circuitry is operative to reconstruct said desired sources using the estimated value of said coefficients and said signal dictionary.

42. The system defined in claim 39 further comprising:

a storage device coupled to said processing circuitry, said storage device comprising a pre-filter signal dictionary having a set of basis functions; and wherein said processing circuitry is operative to apply said at least one directional filter to said set of basis functions to generate said signal dictionary, wherein said elements of said signal dictionary are filtered basis functions.

43. The system defined in claim 42, wherein said processing circuitry is operative to reconstruct said desired sources using the estimated value of said coefficients and said pre-filter signal dictionary.

44. The system defined in claim 42, wherein said at least one directional filter modifies the properties of said basis functions to approximate how said basis functions are received based on a particular location in which said basis functions originate.

45. The system defined in claim 39, wherein said sensor is a first sensor, said system further comprising at least a second sensor to receive said mixture.

46. The system defined in claim 39, wherein said mathematical equations apply an L1 norm optimization condition to estimate the value of said coefficients.

47. A system for performing source separation, comprising:

a sensor for receiving a mixture of a plurality of sources, including desired sources and undesired sources; and processing circuitry coupled to said sensor and operative to:

generate a signal dictionary through application of at least one directional filter, wherein the at least one directional filter is a head-related transfer function; and separate said plurality of sources using elements of said signal dictionary and said mixture as variables in a set of mathematical equations that estimate the value of unknown coefficients corresponding to each of said sources.

48. The system defined in claim 39, wherein said undesired sources comprise noise.

49. A method for generating a signal dictionary, comprising:

providing a pre-filter signal dictionary having a plurality of basis functions;

providing at least one directional filter; and generating a post-filter signal dictionary having a plurality of filtered basis function that are created by applying said at least one directional filter to each basis function in said pre-filter signal dictionary.

50. A method for generating a signal dictionary, comprising:

providing a pre-filter signal dictionary having a plurality of basis functions;

providing at least one directional filter, wherein the at least one directional filter is a head-related transfer function; and generating a post-filter signal dictionary having a plurality of filtered basis function that are created by applying said at least one directional filter to each basis function in said pre-filter signal dictionary.

51. A system comprising processing equipment for generating a signal dictionary, said processing equipment configured to:

store in a storage device at least one directional filter and a pre-filter signal dictionary having a plurality of basis functions; and generate a post-filter signal dictionary having a plurality of filtered basis function that are created by applying said at least one directional filter to each basis function in said pre-filter signal dictionary.

52. A system comprising processing equipment for generating a signal dictionary, said processing equipment configured to:

store in a storage device at least one directional filter and a pre-filter signal dictionary having a plurality of basis functions; and generate a post-filter signal dictionary having a plurality of filtered basis function that are created by applying said at least one directional filter to each basis function in said pre-filter signal dictionary, wherein the at least one directional filter is a head-related transfer function.

53. The system defined in claim 51, wherein said processing equipment is operative to use said post-filter signal dictionary to perform source separation.

* * * * *